United States Patent [19]

Kozawa

[11] 3,920,478
[45] Nov. 18, 1975

[54] DIVALENT SILVER OXIDE-ZINC CELL HAVING A UNIPOTENTIAL DISCHARGE LEVEL

[75] Inventor: Akiya Kozawa, Middleburg Heights, Ohio

[73] Assignee: Union Carbide Corporation, New York, N.Y.

[22] Filed: June 25, 1974

[21] Appl. No.: 482,996

[52] U.S. Cl................ 136/111; 136/20; 136/120 R
[51] Int. Cl.².................... H01M 6/12; H01M 4/24
[58] Field of Search .... 136/20, 30, 107, 111, 120 R

[56] References Cited
UNITED STATES PATENTS

| | | | |
|---|---|---|---|
| 2,795,638 | 6/1957 | Fischbach | 136/120 R |
| 2,811,572 | 10/1957 | Fischbach et al. | 136/34 |
| 3,055,964 | 9/1962 | Solomon et al. | 136/76 |
| 3,118,100 | 1/1964 | Chreitzberg | 320/13 |
| 3,212,934 | 10/1965 | Lander et al. | 136/30 |
| 3,216,860 | 11/1965 | Bergum | 136/68 |
| 3,485,672 | 12/1969 | Ruben | 136/24 |
| 3,520,729 | 7/1970 | Voss et al. | 136/20 |

OTHER PUBLICATIONS

"The Primary Battery," Vol. I, edited by Heise & Cahoon, Wiley, N.Y. (1971), pp. 226–229.
"Zinc–Silver Oxide Batteries," edited by Fleischer & Lander, Wiley, N.Y. (1971), pp. 210–211.

Primary Examiner—John H. Mack
Assistant Examiner—Aaron Weisstuch
Attorney, Agent, or Firm—Cornelius F. O'Brien

[57] ABSTRACT

An alkaline silver oxide-zinc cell having a negative electrode, an alkaline electrolyte, a positive electrode comprising divalent silver oxide housed in a positive terminal container, a separator disposed between the negative electrode and the positive electrode, and wherein a discontinuous oxidizable metal, such as a zinc screen, is interposed between the positive electrode and the inner wall of the positive terminal and/or between the positive electrode and the separator so as to achieve a unipotential discharge level on low drain conditions.

23 Claims, 7 Drawing Figures

DIVALENT SILVER OXIDE-ZINC CELL HAVING A UNIPOTENTIAL DISCHARGE LEVEL

FIELD OF THE INVENTION

This invention relates to alkaline silver oxide-zinc cells, and specifically to such cells wherein the positive electrode comprises divalent silver oxide having electrical contact means, and wherein a discontinuous oxidizable metal material is interposed between the positive electrode and the electrical contact means and/or between the positive electrode and the cell separator.

BACKGROUND OF THE INVENTION

Miniature button alkaline silver oxide-zinc cells have gained wide acceptance in the battery industry for many application because they are characterized as being high capacity, small volume electric cells. In other words, they have a high power output and energy density per unit weight and unit volume of active cathode material. However, one of the major disadvantages of silver oxide-zinc cells is that they discharge at two different potentials. This is due to the fact that the active cathode materials of such cells are usually both divalent silver oxide (AgO) and monovalent silver oxide ($Ag_2O$). Silver oxide-zinc cells using monovalent silver oxide as the only active cathode material will have a theoretical unipotential discharge at about 1.57 volts but the capacity in millampere hours per gram of monovalent silver oxide is substantially lower than the capacity of divalent silver oxide. On the other hand, silver oxide-zinc button cells using divalent silver oxide as the only active cathode material will discharge at a first potential at about 1.7 volts across a 300-ohm resistor for 40 hours, for example, and then drop to approximately 1.5 volts for an additional period of time of about 70 hours. Thus monovalent silver oxide cells have the advantage of discharging at a unipotential plateau with the disadvantage of having a rather low capacity while divalent silver oxide cells have the advantage of having a rather high capacity but the disadvantage of discharging at two distinct voltage plateaus. Divalent silver oxide has about 1.9 times more capacity per gram than monovalent silver oxide and about 2 times more capacity per unit volume than monovalent silver oxide.

Many cell or battery applications, particularly transistorized devices such as hearing aids, watches and the like, require a substantial unipotential discharge source for proper operation and, therefore, cannot use the dual voltage level discharge which is characteristic of divalent silver oxide cells.

Consequently, many methods have been proposed for obtaining a unipotential discharge from a divalent silver oxide cell. One method disclosed in U.S. Pat. Nos. 3,615,858, and 3,655,450, entails providing a continuous layer of monovalent silver oxide in physical and electrical contact with a divalent silver oxide pellet. During assembly of the cell the cathode pellet is disposed against the inner surface of a cathode cup or collector whereupon the layer of monovalent silver oxide physically isolates the divalent silver oxide from contact with the cathode cup so that the sole electronic path for discharge of the divalent silver oxide is through the monovalent silver oxide layer.

In U.S. Pat. No. 3,476,610 a silver oxide battery is disclosed which employs a positive electrode comprised mainly of divalent silver oxide with the addition of monovalent silver oxide present in part as an electrolyte-impermeable masking layer. This layer isolates the divalent silver oxide from contact with the electrolyte of the battery until discharge begins whereupon the monovalent silver oxide becomes electrolyte-permeable. When this occurs, the electrolyte then beings to contact the divalent silver oxide. In addition, the monovalent silver oxide is also present as an interposed layer between the divalent silver oxide and the inner surface of the cathode cup or collector so as to isolate the divalent silver oxide from physical contact with said cathode cup which is the positive terminal of the cell.

In U.S. Pat. No. 3,484,295 a silver oxide battery is disclosed which utilizes a positive silver oxide electrode comprising divalent silver oxide and monovalent silver oxide. The latter oxide is employed as an electrolyte-impermeable layer which is interposed between the divalent silver oxide and the battery components containing the electrolyte so as to isolate the divalent silver oxide from contact with the electrolyte until the monovalent silver material is discharged. If the discharge product of the monovalent silver oxide material is oxidized by the divalent silver oxide material in the presence of the battery electrolyte, then it is possible that the battery will yield a unipotential discharge.

Although it is theoretically possible to produce a unipotential discharge from a divalent silver oxide cell using the above teachings, it requires a high degree of quality control to insure that the necessary layer of monovalent silver oxide is disposed in its proper location so as to prevent any of the divalent silver oxide from directly contacting the cathode or positive terminal in one cell arrangement and/or the electrolyte of the cell in another arrangement.

My copending patent application Ser. No. 483,014, filed June 25, 1974, discloses another approach to producing divalent silver oxide-zinc cells having a unipotential discharge level on low drain conditions. The cells use a positive electrode comprising divalent silver oxide housed in a positive electrode container having an upstanding wall and a closed end. Interposed between the positive electrode and the inner upstanding wall of the cathode container is an oxidizable zinc ring which functions to isolate a portion of the positive electrode from the container so as to produce a unipotential discharge on low drain conditions.

Another of my copending patent applications Ser. No. 482,995, filed June 25, 1974, discloses a process whereby silver oxide-zinc cells having a positive electrode comprising divalent silver oxide housed in a cathode container are given a predischarge on a high current drain such that a substantial silver layer is formed at the interface between the positive electrode and the cathode container with the concentration of silver decreasing from a maximum at the interface to a minimum within the center portion of the positive electrode.

Accordingly, it is the primary object of this invention to provide a silver oxide-zinc cell which employs a positive electrode comprising divalent silver oxide and which has a substantially unipotential discharge plateau over the useful life of the cell.

Another object of this invention is to provide a silver oxide-zinc cell which employs a positive electrode comprising divalent silver oxide and which has a predictable discharge potential curve.

Another object of this invention is to provide a silver oxide-zinc cell which employs a discontinuous oxidizable metal material disposed between a portion of the cell's positive electrode and the inner surface of the cell's cathode container, said positive electrode comprising divalent silver oxide and said cathode container being the positive terminal of the cell.

Another object of this invention is to provide a silver oxide-zinc cell which employs an oxidizable metal screen interposed between a portion of the cell's positive electrode and the inner surface of the cell's cathode container and between a portion of the cell's positive electrode and the cell's separator.

Another object of this invention is to provide a silver oxide-zinc cell which employs an oxidizable metal screen between a portion of the cell's positive electrode and the separator.

SUMMARY OF THE INVENTION

The invention relates to an alkaline silver oxide cell having a negative electrode, e.g., zinc, a positive electrode housed in a conductive container having a bottom surface and side wall, a separator disposed between said negative electrtode and said positive electrode, said positive electrode comprising divalent silver oxide and wherein a discontinuous oxidizable metal material is interposed between, and electrically and physically in contact with, said positive electrode and the inner surface of the conductive container and/or between said positive electrode and said separator so that the electrochemical reaction of the oxidizable metal material with the positive electrode in the presence of the electrolyte will effectively produce a substantially unipotential discharge plateau over the useful life of the cell.

As used herein, a discontinuous metal material shall mean a metal screen, a metal strip, or a plurality of discrete metal particles which when disposed on a flat surface in a substantially dispersed arrangement will define a plurality of openings or spaces between adjacent particles.

Whether using the metal screen embodiment, the metal strip embodiment, or the discrete metal particle embodiment, it is preferable that when either is interposed between the positive (cathode) silver oxide electrode and the inner surface of the cathode container (terminal) and/or between the positive electrode and the separator, the metal material and, where applicable, the openings or spaces disposed or defined within or by the metal material be substantially uniformly dispersed therebetween. This feature is desirable to insure a more rapid and uniform electrolyte contact between the oxidizable metal material and the active silver oxide cathode of the cell after assembly so that the reaction between these materials will occur substantially uniformly therebetween. This reaction between the oxidizable metal material and the active cathode material of divalent silver oxide in the presence of the electrolyte of the cell is believed to result in a portion of the divalent silver oxide being reduced to silver with possibly a minor amount of monovalent silver oxide with or without the oxide of the oxidizable metal.

The amount of oxidizable metal used, as based on the electrochemical capacity of the total active cathode material, should be at least about 0.5%. The use of less than the lower limit of 0.5% would provide insufficient oxidizable metal to effectively react with the cathode to produce the unipotential discharge.

In the preferred embodiment, a metal screen is employed wherein the opening area in the oxidizable metal body should be greater than about 20% of the surface of the oxidizable metal which contacts the cathode container. The 20% opening requirement of the oxidizable metal is important, since it provides a greater surface area of the oxidizable metal which can react with the divalent silver oxide upon introduction of the cell electrolyte. Thus, the unipotential discharge level would be reached more rapidly either on discharge or on storage.

When using a metal strip, the plane area of the strip should be no greater than the plane area of the inner bottom of the cathode container, i.e., exclusive of the side wall(s).

The amount of oxidizable metal to be disposed between the silver oxide cathode and the cathode container and/or the cathode and the separator can vary somewhat depending on the thickness of the screen, strip, or on the size of the discrete particles, whichever is used. However, the oxidizable metal should be disposed between the positive silver oxide electrode and cathode collector or between the positive electrode and the separator so that between about 10% and about 80% of the normally common contacting area of these components has the metal material interposed. Preferably, the oxidizable metal should be interposed between about 20% and about 60% of the common contacting area.

The upper limit on the total amount of oxidizable metal employed should be less than that which would completely reduce the divalent silver oxide to the monovalent level. For example, in a cell having an all-divalent silver oxide cathode, if one were to use an amount equivalent to 50% of the divalent silver oxide capacity, the capacity output of this cell would be no greater than if an all-monovalent silver oxide cathode were used. A practical range of oxidizable metal of between about 2% and about 10% of the divalent silver oxide capacity is preferred.

As used herein, the term screen shall mean any sheet of material having a plurality of openings or apertures produced, for example, by either perforating a solid sheet of material; by interlocking wire strands or links in a conventional arrangement to form a mesh of net construction; or by imparting a plurality of small slits in an expandable sheet of material so that upon being expanded in a direction perpendicular to the slits, diamond-shaped openings will be disposed in the expanded sheet.

As used herein, a metal strip shall mean any geometrically shaped essentially solid metal member such as a metal disk, rectangular-shaped strip, square, diamond, circular cross-sectional body, annulus, or the like.

As is apparent, the use of a metal screen or metal strip rather than the discrete metal particles would facilitate the assembling of the cell components and also provide for a more exact distribution of the metal and, where applicable, the openings or spaces within or defined by the metal, between the silver oxide cathode and the cathode terminal.

As used in this invention, oxidizable metal shall mean a metal that will electrochemically react with divalent silver oxide in the presence of the electrolyte of the cell during storage or during the initial discharge of the cell to produce metallic silver with possibly a minor amount of monovalent silver oxide with or without the oxide of the oxidizable metal which will effectively isolate a portion of the divalent silver oxide from the inner surface of the positive electrode terminal. A suitable metal for use in this invention can be selected from the group consisting of zinc, copper, silver, tin, cadmium, and lead. Of the above metals, zinc is preferable in a zinc cell system because it introduces no foreign ions into the cell and will easily form zinc oxide in the presence of an alkaline electrolyte. Furthermore, since zinc oxide has a low electrical resistance, it will provide a good electrical path between the silver oxide and the cathode container. Similarly, cadmium would be ideally suited for this use when a cadmium anode is employed.

Although it is theoretically possible that nickel can be considered an oxidizable material, it has been found that when nickel or nickel alloy cathode containers are employed to house a positive divalent siver oxide electrode, the output voltage is characterized as having a distinct two-step plateau, wherein the higher plateau is displayed for an undesirably long portion of the discharge period.

The active cathode material of this invention can be 100% divalent silver oxide or a mixture of divalent silver oxide and monovalent silver oxide. When using mixtures of the silver oxides, preferably at least 50% by weight of the mixture should be divalent silver oxide because of its high characteristics. The silver oxide electrode can be formed in a number of ways as, for example, finely divided divalent silver oxide powder, mixed with or without monovalent silver oxide, can be pelletized into a desired size pellet using a conventional die. Regardless of how the electrode is made, it has to be sufficiently porous to permit the electrolyte of the cell to diffuse through the electrode. However, the pellet also has to be sufficiently dense so that it can occupy a relatively small space when used in miniature type cell housings if it is to provide the required capacity of such cells.

The use of an oxidizable metal material disposed in electrical and physical contact between the positive electrode and the inner surface of the positive container and/or between the positive electrode and the separator of a silver oxide-zinc cell according to this invention will permit a more rapid electrolyte contact and better electrolyte distribution between the metal material and the adjacent silver oxide electrode on addition of the cell's electrolyte during assembly than would otherwise be obtainable when using a continuous coating or liner of the oxidizable metal. In the preferred embodiment, the metal screen is employed because it is believed that the porous metal structure will more effectively act as a wicking means to promote better electrolyte distribution.

With the addition of an oxidizable metal material to a 100% divalent silver oxide cell of a 220 nominal milliampere-hour rated capacity according to this invention, the discharge voltage of the cell on a 16 microampere drain (96 K-ohm load) will initially be that of the divalent silver oxide but within a period of 1 hour or less, and usually only 15 minutes, the voltage will drop to that of the monovalent silver oxide level where it will remain until the cell is fully discharged. Contrary to this, an identical cell, but without the oxidizable metal material, will discharge on a 16 microampere drain at the voltage of the divalent silver oxide level for over 500 hours before dropping to the voltage level of the monovalent silver oxide.

After partial discharge of 100% AgO cell employing an oxidizable metal material, the open circuit voltage will return to the AgO level on shelf storage. On subsequent discharge, however, the closed circuit voltage of the cell will return to the $Ag_2O$ level within 15 to 60 minutes.

With the addition of an oxidizable metal material to a 50% divalent-50% monovalent silver oxide cell of a 250 nominal millampere-hour rated capacity according to this invention, the discharge voltage of the cell on a 25 microampere drain (62 K-ohm load) will be that of the monovalent silver oxide level within 5 minutes and remain at this level throughout discharge.

DESCRIPTION OF THE PREFERRED EMBODIMENT

Figure 1:
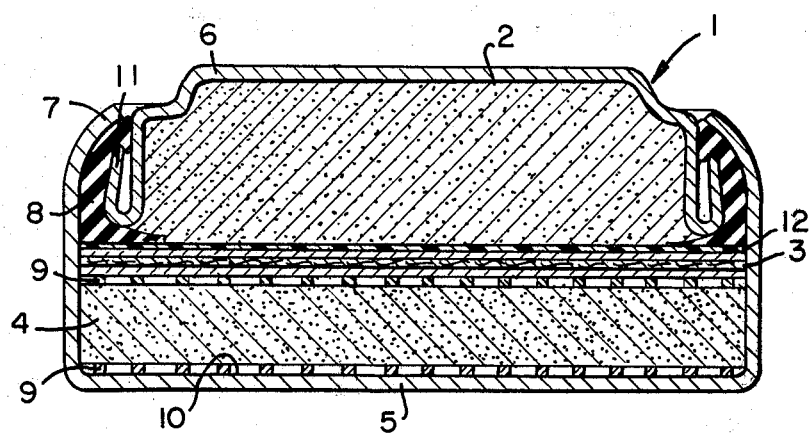
FIG. 1 is a cross-sectional view of a silver oxide-zinc cell having an oxidizable metal screen disposed between the positive silver oxide electrode and the inner wall of the cathode container in accordance with the present invention.
Figure 2:
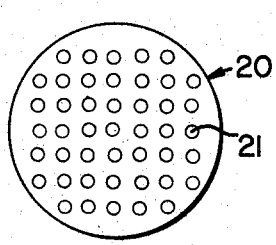
FIG. 2 is a top view of an oxidizable metal sheet having apertures which is suitable for use in a silver oxide-zinc cell as generally shown in FIG. 1.

The preferred embodiment of this invention can be described in conjunction with FIGS. 1 to 4. Referring to FIG. 1, there is shown a sectional elevation of a silver oxide-zinc cell having a negative electrode 2, separator 3, and positive electrode 4 housed within a two-part container comprising a cathode container 5 and anode cup 6. As shown, cathode container 5 has a flange 7 which is crimped inwardly against a U-shaped flange 11 on anode cup 6 via grommet 8 during assembly to seal the cell as disclosed, for example, in U.S. Pat. No. 3,069,489. The cathode container 5 may be of nickel-plated steel, nickel, stainless steel, or the like, while the anode cup 6 may be made of tin-plated steel, copper-clad stainless steel, gold-plated copper-clad stainless steel, or the like. The grommet 8 may be made of a suitable resilient electrolyte-resistant material such as neoprene, nylon, or the like.

The separator 3 may be a three-layer laminate consisting of two outer layers of radiation-grafted polyethylene and an inner cellophane layer or the like. Disposed between anode 2 and separator 3 is a layer of electrolyte-absorbent material 12 which may consist of various cellulosic fibers.

The anode (negative) electrode can comprise a lightly compressed pellet 2 of finely divided amalgamated zinc containing, if desired, a gelling agent. Cadmium may also be used as the anode material. The cathode (positive) electrode can comprise a rather densely compressed pellet 4 of divalent silver oxide powder or a mixture of divalent silver oxide powder and monovalent silver oxide powder.

The cell electrolyte may be an aqueous solution of potassium hydroxide, sodium hydroxide, or mixtures thereof.

As shown in FIG. 1, an oxidizable metal screen 9 is interposed between positive electrode 4 and the inner bottom surface 10 of cathode container 5 and between the positive electrode 4 and the separator 3. Preferably the metal screen 9 should be placed in only one of the above two positions, although it could be placed in both positions as shown in FIG. 1. However, when using two oxidizable metal members, the overall amount of said metal and the total plane area of said metal should be within the limits specified above. Metal screen 9 is of the type shown in FIG. 2 which comprises a metal sheet 20 having apertures 21.

Figure 3:
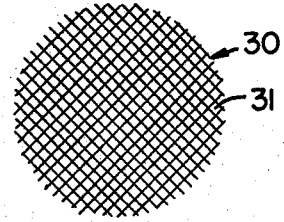
FIG. 3 is a top view of an oxidizable metal mesh suitable for use in a silver oxide-zinc cell as generally shown in FIG. 1.

FIG. 3 shows another preferred embodiment of a discontinuous metal member for use in this invention which comprises a metal mesh 30 having apertures 31.

Figure 4:
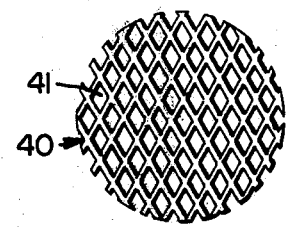
FIG. 4 is a top view of an oxidizable expanded metal suitable for use in a silver oxide-zinc cell as generally shown in FIG. 1.

FIG. 4 shows a further preferred embodiment of a discontinuous metal member for use in this invention which comprises expanded metal 40 having apertures 41.

Figure 5:
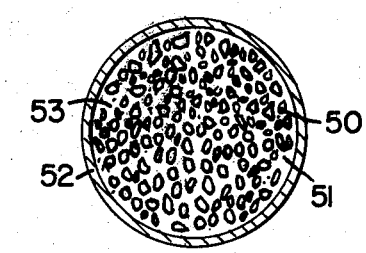
FIG. 5 is a top view of a cut-away cathode container showing discrete oxidizable metal particles uniformly dispersed on the inner bottom surface of the cathode container.

An alternate embodiment of a discontinuous metal arrangement for use in this invention is shown in FIG. 5 wherein metal particles 50, such as powder, are shown uniformly dispersed about the inner bottom surface 51 of a cathode container 52. The metal particles are arranged in such a manner that adjacent particles define openings or spaces 53. These spaces 53 perform the same function as the apertures shown in FIGS. 2 to 4, that being to permit more rapid electrolyte contact between the oxidizable metal and the positive electrode on addition of the electrolyte to the cell during assembly.

Figure 6:
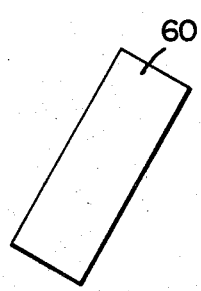
FIG. 6 is a top view of an oxidizable rectangular metal strip suitable for use in a silver oxide-zinc cell as generally shown in FIG. 1.

FIG. 6 shows a discontinuous rectangular metal strip for use in this invention which strip is identified as 60. Metal strip 60 would be disposed within the silver oxide-zinc cell in place of the metal screen 9 discussed above and shown in FIG. 1.

Figure 7:
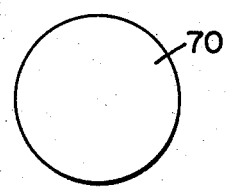
FIG. 7 is a top view of an oxidizable metal disk suitable for use in a silver oxide-zinc cell as generally shown in FIG. 1.

FIG. 7 shows a discontinuous metal disk for use in this invention which disk is identified as 70. Metal disk 70 would be disposed within the silver oxide-zinc cell in place of the metal screen 9 discussed above and shown in FIG. 1.

It is also within the scope of this invention to connect two or more cells in series or parallel by conventional means and then place them in a housing to produce a battery which can be used in various battery-operated devices.

EXAMPLE 1

Three miniature button cells of the type shown in FIG. 1, diameter 0.450 inch and overall height approximately 0.210 inch, were produced using a gelled zinc powder anode, a pellet of active cathode material of 50/50 by weight $AgO/Ag_2O$ molded at about a 2-ton pressure and a 3-layer separator consisting of two outer layers of radiation-grafted polyethylene and an inner cellophane layer. An additional electrolyte-absorbent separator layer was employed adjacent to the anode. These components along with a 22% NaOH electrolyte (5.5 M NaOH) were assembled in a nickel-plated cathode container and a gold-plated copper-clad stainless steel anode cup and then the cell was sealed by crimping the top annular section of the cathode container inwardly against the anode cup as described in U.S. Pat. No. 3,069,489 via a grommet of nylon.

Each cell, when discharged across a 62 K-ohm resistor at room temperature on a drain of 25 microamperes, exhibited the higher AgO voltage level. On a continuous discharge, it took the two cells an average of 8 hours before the higher divalent oxide voltage dropped to the monovalent voltage level.

EXAMPLE 2

Three cells, identical to the miniature button cells of Example 1, were produced, except that a 0.003 inch thick expanded zinc mesh was interposed between the 50/50 by weight $AgO/Ag_2O$ cathode and the cathode container, as shown in FIGS. 1 and 4. The expanded zinc mesh had a strand width of 0.003 inch and mesh dimensions of 0.31 inch by 0.22 inch.

After storage at room temperature for 456 hours, each cell was discharged across a 62 K-ohm resistor at 95°F, on a drain of 25 microamperes. Both the open circuit voltage and the discharge voltage of each cell over a continuous period of 24 hours were at the lower $Ag_2O$ voltage plateau of 1.60 and 1.59, respectively. This demonstrates the effectiveness of having a discontinuous oxidizable metal material interposed between the silver oxide cathode and the cathode container to produce a unipotential discharge even though the cathode was 50% by weight divalent silver oxide.

EXAMPLE 3

Two cells, identical to the miniature button cells of Example 2, were produced, except that the cathode consisted of 100% AgO.

After storage at room temperature for four months, each cell was then discharged across a 96 K-ohm resistor and after a period ranging from 15 to 60 minutes on discharge, the voltage of each cell dropped from the divalent plateau of 1.78 to the monovalent plateau of 1.57. This demonstrates that the monovalent voltage level can be obtained from a silver oxide cell using a 100% divalent silver oxide cathode by employing the teachings of this invention. The discharge of this type cell on a continuous load of 96 K-ohms is felt to represent a severe test condition for obtaining the lower voltage level since, under this condition, the monovalent silver oxide voltage level is least likely to be obtained or displayed.

EXAMPLE 4

Three cells, identical to the miniature button cells of Example 1, were produced, except that a zinc strip measuring 0.070 inch wide, 0.442 inch long, and 0.007 inch thick was disposed between the cathode and the inner bottom of the cathode container.

After storage at room temperature for 30 days, each cell was discharged across a 62 K-ohm resistor at 95°F., on a drain of 25 microamperes. Both the open circuit voltage and the discharge voltage of each cell over a continuous period of 24 hours were at the lower $Ag_2O$ voltage plateau of 1.59 and 1.57, respectively. This demonstrates the effectiveness of having a discontinuous oxidizable metal strip interposed between the silver oxide cathode and the cathode container to produce a unipotential discharge even though the cathode contained a 50/50 mixture of divalent silver oxide and monovalent silver oxide.

From the above examples, we see that using the teaching of this invention a silver oxide cell using a 50/50 AgO/Ag$_2$O cathode can exhibit a monovalent voltage level (open circuit) of about 1.57 volts after being stored at room temperature for a period of 456 hours. It also demonstrates that a silver oxide cell using a 100% AgO cathode can exhibit a monovalent voltage level of about 1.57 volts after being discharged on a low drain (96 K-ohm load) for a period of only 15 to 60 minutes. It has also been observed that, when using a zinc screen, the separator showed less degradation due to oxidation than the separators in the cells that did not contain the zinc screen.

It is to be understood that other modifications and changes in the preferred embodiments of the invention herein shown and described can also be made without departing from the spirit and scope of the invention.

What is claimed is:

1. In an alkaline silver oxide cell comprising a negative electrode, a positive electrode housed in a conductive container having a bottom surface and a side wall, a separator disposed between said negative electrode and said positive electrode, and an electrolyte; said positive electrode comprising divalent silver oxide, the improvement wherein a discontinuous oxidizable metal material is interposed between and in electrical and physical contact with said positive electrode and the inner surface of the conductive container, so that the reaction of the oxidizable metal in the presence of the electrolyte will produce a substantially unipotential discharge over the useful life of the cell.

2. The alkaline silver oxide cell of claim 1 wherein said positive electrode is a mixture of monovalent silver oxide and at least 50% by weight of divalent silver oxide.

3. The alkaline silver oxide cell of claim 2 wherein said positive electrode is a mixture of 50% by weight monovalent silver oxide and 50% by weight divalent silver oxide.

4. The alkaline silver oxide cell of claim 1 wherein the discontinuous oxidizable metal material is selected from the group consisting of zinc, copper, silver, tin, cadmium, and lead.

5. The alkaline silver oxide cell of claim 4 wherein said discontinuous oxidizable metal is a zinc screen.

6. The alkaline silver oxide cell of claim 5 wherein said metal material is expanded zinc.

7. The alkaline silver oxide cell of claim 5 wherein said metal material is a zinc mesh.

8. The alkaline silver oxide cell of claim 5 wherein said metal material is a perforated zinc sheet.

9. The alkaline silver oxide cell of claim 4 wherein said metal material is composed of discrete zinc particles.

10. The alkaline silver oxide cell of claim 3 wherein the discontinuous metal material is a zinc screen.

11. The alkaline silver oxide cell of claim 3 wherein the discontinuous metal material is a zinc strip.

12. An alkaline silver oxide cell as in claim 1 wherein a second discontinuous oxidizable metal material is interposed between, and electrically and physically in contact with, said positive electrode and said separator.

13. The alkaline silver oxide cell of claim 12 wherein the discontinuous oxidizable metal material interposed between the positive electrode and the conductive container is a zinc screen and wherein the second discontinuous oxidizable metal material interposed between the positive electrode and the separator is a zinc screen.

14. In an alkaline silver oxide cell comprising a negative electrode, a positive electrode housed in a conductive container having a bottom surface and side wall, a separator between said negative electrode and said positive electrode, and an electrolyte; said positive electrode comprising divalent silver, the improvement wherein a discontinuous oxidizable metal material is disposed between and in electrical and physical contact with said positive electrode and said separator.

15. The alkaline silver oxide cell of claim 14 wherein said positive electrode is a mixture of monovalent silver oxide and at least 50% by weight of divalent silver oxide.

16. The alkaline silver oxide cell of claim 15 wherein said positive electrode is a mixture of 50% by weight monovalent silver oxide and 50% by weight divalent silver oxide.

17. The alkaline silver oxide cell of claim 14 wherein the discontinuous oxidizable metal material is selected from the group consisting of zinc, copper, silver, tin, cadmium, and lead.

18. The alkaline silver oxide cell of claim 17 wherein said discontinuous oxidizable metal is a zinc screen.

19. The alkaline silver oxide cell of claim 18 wherein said metal material is expanded zinc.

20. The alkaline silver oxide cell of claim 18 wherein said metal material is a zinc mesh.

21. The alkaline silver oxide cell of claim 18 wherein said metal material is a perforated zinc sheet.

22. The alkaline silver oxide cell of claim 16 wherein the discontinuous metal material is a zinc screen.

23. The alkaline silver oxide of claim 14 wherein the discontinuous metal material is a zinc strip.

* * * * *